United States Patent
Fornaro et al.

(10) Patent No.: US 9,079,200 B2
(45) Date of Patent: Jul. 14, 2015

(54) MULTI-CONTAINER BACKPACK STYLE SPRAYER

(71) Applicants: Ross Mark Fornaro, Hanover, PA (US); James Harold Belt, Jr., Reistertown, MD (US)

(72) Inventors: Ross Mark Fornaro, Hanover, PA (US); James Harold Belt, Jr., Reistertown, MD (US)

(*) Notice: Subject to any disclaimer, the term of this patent is extended or adjusted under 35 U.S.C. 154(b) by 148 days.

(21) Appl. No.: 13/748,120

(22) Filed: Jan. 23, 2013

(65) Prior Publication Data

US 2013/0186977 A1    Jul. 25, 2013

Related U.S. Application Data

(60) Provisional application No. 61/589,622, filed on Jan. 23, 2012.

(51) Int. Cl.
| | |
|---|---|
| *B05B 9/08* | (2006.01) |
| *B05B 1/30* | (2006.01) |
| *B05B 7/04* | (2006.01) |
| *B05B 7/24* | (2006.01) |
| *B05B 12/14* | (2006.01) |

(Continued)

(52) U.S. Cl.
CPC ... *B05B 9/08* (2013.01); *B05B 1/30* (2013.01); *B05B 7/0408* (2013.01); *B05B 9/085* (2013.01); *A01C 23/047* (2013.01); *A01M 7/0046* (2013.01); *B05B 7/2464* (2013.01); *B05B 7/2472* (2013.01); *B05B 7/2475* (2013.01); *B05B 12/14* (2013.01)

(58) Field of Classification Search
CPC ........ B05B 9/08; B05B 7/2464; B05B 9/085; B05B 9/0822; B05B 9/0883; B05B 9/0877; B05B 7/0408; B05B 7/2475; B05B 7/2472; B05B 12/14; A01C 23/047; A01M 7/0042; A01M 7/0046
USPC ................. 239/124, 127, 152, 154, 303, 305; 137/239, 240, 883; 222/318, 424, 222/145.2, 175, 132, 145.1, 145.4, 401, 397
See application file for complete search history.

(56) References Cited

U.S. PATENT DOCUMENTS

| | | | |
|---|---|---|---|
| 381,263 A | 5/1888 | Weaber | |
| 2,162,057 A * | 6/1939 | Brandt et al. | ................. 239/154 |

(Continued)

FOREIGN PATENT DOCUMENTS

WO    WO 2009/146515 A1 * 10/2009

*Primary Examiner* — Len Tran
*Assistant Examiner* — Cody Lieuwen
(74) *Attorney, Agent, or Firm* — Ober, Kaler, Grimes & Shriver; Royal W. Craig

(57) ABSTRACT

A multi-container manual-pump-operated backpack sprayer including an open-topped backpack enclosure, a plurality (preferably three) modular liquid containers removably seated in the enclosure, a hand-lever-operated pump/accumulator combination, and a user-controllable manifold for selecting a particular chemical from the containers for administration through a spray wand. Chemical is carried to the pressure chamber by manually pumping. The pump draws liquid from a manifold-selected supply container outward through tubes to the manifold, which has a console of valves. Separate return tubes are provided for each chemical from the manifold back to the containers of origin, and the manifold allows convenient flushing of each chemical back to its container of origin. This ensures that chemicals are not mixed or cross-contaminated and avoids waste since all residual is returned back to its respective container. The manifold is conveniently carried at the hip for ease of access.

16 Claims, 5 Drawing Sheets

(51) Int. Cl.
  *A01C 23/04* (2006.01)
  *A01M 7/00* (2006.01)

(56) References Cited

U.S. PATENT DOCUMENTS

| | | | | |
|---|---|---|---|---|
| 3,966,092 A | * | 6/1976 | Ballu | 222/175 |
| D295,442 S | * | 4/1988 | Witte | 23/225 |
| 4,768,714 A | * | 9/1988 | Luchsinger | 239/142 |
| 5,150,837 A | * | 9/1992 | Ferrari | 239/153 |
| 5,284,300 A | | 2/1994 | Gries et al. | |
| 5,335,853 A | * | 8/1994 | Wirz | 239/142 |
| 5,478,015 A | * | 12/1995 | Black | 239/154 |
| 5,636,791 A | * | 6/1997 | Leer | 239/142 |
| 5,671,884 A | * | 9/1997 | Restive | 239/154 |
| 5,755,361 A | | 5/1998 | Restive et al. | |
| 5,857,618 A | | 1/1999 | Restive et al. | |
| 6,158,670 A | * | 12/2000 | Blocker | 239/153 |
| 6,412,707 B1 | * | 7/2002 | Wirz | 239/154 |
| 6,691,937 B2 | * | 2/2004 | Heren et al. | 239/570 |
| 7,556,210 B2 | | 7/2009 | Mandell et al. | |
| 7,793,804 B2 | | 9/2010 | McGiveron | |
| 7,854,396 B2 | * | 12/2010 | Wu | 239/152 |
| 7,905,428 B1 | * | 3/2011 | Probasco | 239/305 |
| 2006/0261181 A1 | * | 11/2006 | Wirz | 239/146 |
| 2008/0185459 A1 | * | 8/2008 | An et al. | 239/267 |
| 2012/0175429 A1 | * | 7/2012 | Zupsic | 239/8 |

* cited by examiner

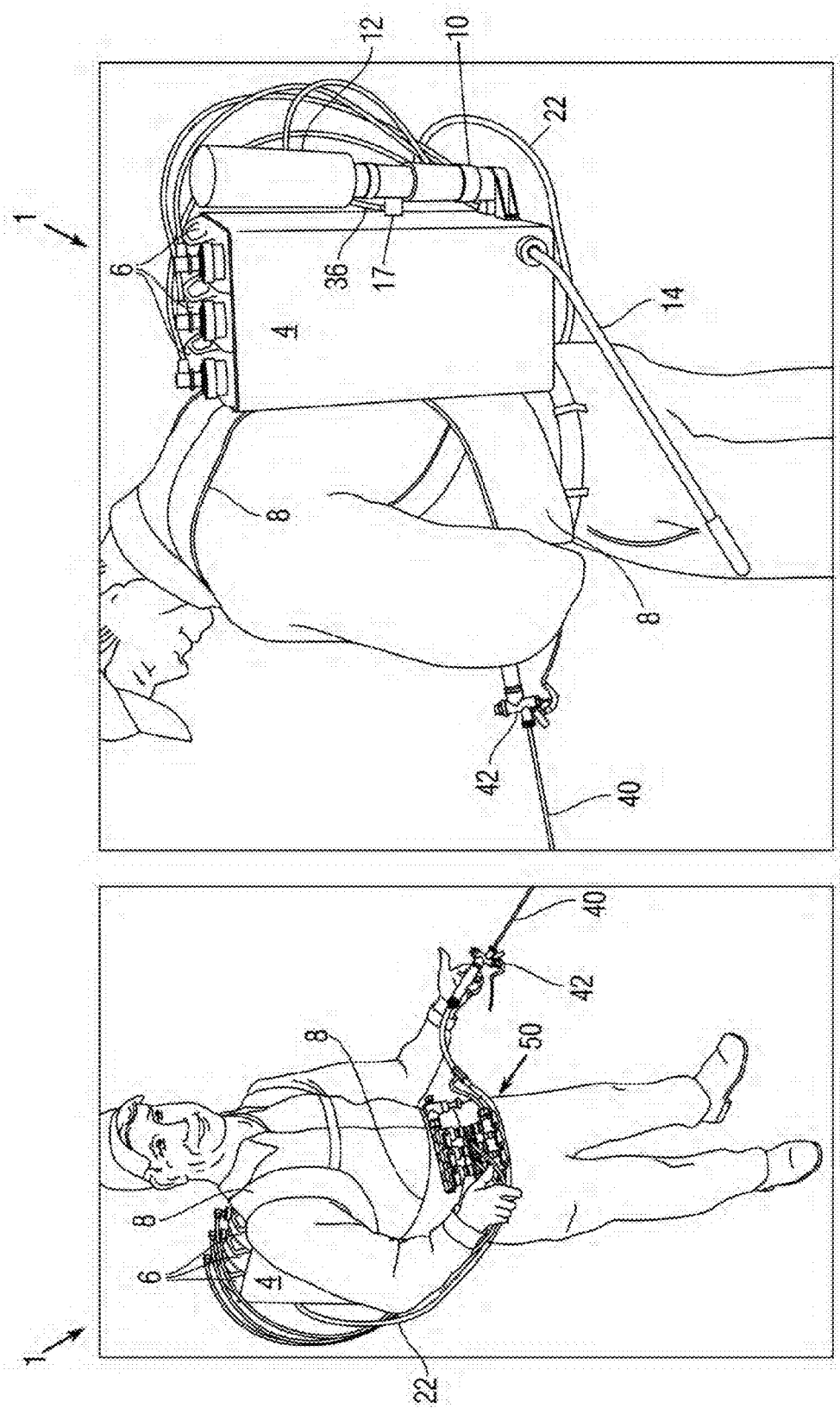

MULTI-CONTAINER BACKPACK STYLE SPRAYER

CROSS-REFERENCE TO RELATED APPLICATION(S)

The present invention derives priority from U.S. provisional application No. 61/589,622 filed Jan. 23, 2012.

BACKGROUND OF THE INVENTION

1. Field of the Invention

The present invention relates to portable commercial-grade agricultural sprayers and, more particularly, to a portable backpack-style manual-pump-operated agricultural sprayer for spraying through a hand-carried spray wand any of a variety of different chemicals from modular containers seated in a backpack housing.

2. Description of the Background

There are a wide variety of sprayers available for application of liquid fertilizers and pest control solutions, including backpack sprayers, hand sprayers, and truck-mounted spray tank systems. The simplest sprayers are designed for consumer use and typically comprise a single container with a piston pump and hand-carried wand. However, these sprayers are typically one or two gallons in size and are meant for simply maintaining a lawn or garden. The lawn and landscape industry demand more efficient commercial-grade sprayers for multiple and larger jobs, and backpack sprayers have become standard equipment in most commercial operations. Backpack sprayers afford great mobility for larger jobs on terrain where stationery equipment can't go. Backpack sprayers typically use a polyethylene plastic chemical-holding tank with a capacity of up to four gallons, with an attached shoulder harness and hand-carried spray wand.

Although motorized-pump backpack sprayers or gas cartridge ($CO_2$) powered sprayers exist, the most popular commercial-grade sprayers are manually powered backpack-style sprayers in which the chemical-holding tank is equipped with a pump and pumping lever. The chemical-holding tank itself is not typically pressurized by the pump, but rather each tank has a smaller, pressurizing chamber. Liquid is carried from the chemical-holding tank to the pressurizing chamber by the pump, where the chemical remains until the operator squeezes a trigger-valve on the spray wand. Several pump types are available, but the two most common are piston and diaphragm pumps.

Relatively high pressures can be reached with manual backpack sprayers, although most operate at 15 to 95 psi. However, since pressure gradually decreases as the tank empties and spray is applied, the operator must periodically pump the device to make sure that pressure remains constant and that enough flow reaches the nozzle at the desired pressure.

Such backpack sprayers are not new. They date back at least to 1888 (as per U.S. Pat. No. 383,261). However, more recently backpack sprayers have grown in popularity and a number of patents have issued for design improvements.

For example, U.S. Pat. No. 2,162,057 to Brandt issued Jun. 13, 1939 shows a backpack sprayer having a tank with internal accumulator. A hand-operated piston pump pumps liquid from the container tank to the pressure vessel. As liquid is pumped in from the bottom, the air inside is compressed at the top and this provides a pressure source for discharging the liquid out from the spray nozzle.

U.S. Pat. No. 5,335,853 to Wirz issued Aug. 9, 1994 shows a backpack sprayer similar to the '057 patent to Brandt but incorporating a double-acting piston pump. Upon reciprocation of the piston either direction there is pumping of liquid from the container tank to the pressure vessel.

U.S. Pat. No. 5,284,300 to Gries et al. issued Feb. 8, 1994 shows a portable spray system with backpack carriage containing two water storage containers.

U.S. Pat. No. 5,636,791 to Leer (Gilmour, Inc.) issued Jun. 10, 1997 shows a backpack sprayer with an adjustable valve 43 that allows the operator to adjust the pressure release valve 42 of the container to a specific pressure.

U.S. Pat. Nos. 5,755,361 and 5,857,618 both to Restive et al. (D.B. Smith, Inc.) issued May 26, 1998 and Jan. 12, 1999, respectively shows a backpack pump sprayer with an expanding accumulator pump (internal balloon-like bladder) that elastically ejects liquid.

U.S. Pat. No. 7,793,804 by McGiveron (Chapin Manufacturing, Inc.) issued Sep. 14, 2010 shows a dual-action pump assembly for sprayers that overcomes a "hydrolock" problem caused by residual chemical by a one-way valve that lets in additional air during the suction part of the cycle.

U.S. Pat. No. 7,556,210 to Mandell et al. issued Jul. 7, 2009 shows a portable mixing sprayer in a wheeled or motorized unit.

R&D Sprayers produces its Model 315FG (Flash Gordon Model) which is a backpack sprayer designed to dispense from multiple bottles using $CO_2$ cylinder pressurization.

While these prior art devices are useful to a degree, they still suffer from certain drawbacks in that they do not provide sufficient durability and reliability without materially adding to the cost or weight of the device. The primary design goals of any manual pump-operated backpack sprayer are performance, reliability, durability, ease of use, light weight, low cost, and ease of manufacture. In addition, one notable problem with conventional manual pump-operated backpack sprayers has been the difficulty in changing chemicals. A typical lawn care treatment may require application of several different chemicals successively, and upon each changeover of chemical the sprayer tank must be drained and refilled. This is cumbersome and if not done thoroughly there is a high propensity for cross-contamination. Some chemicals, notably broad-leaf herbicides, can be difficult to fully rinse from spray tanks due to their affinity for the plastic. Moreover, residual chemicals typically remain in the compression chamber, sprayer wand and/or hose. Operators are forced to fully wash the inside of the sprayer tank and flush all internal components between applications, and this is very tedious. Still, if any residual remains serious problems can result. Upon the next successive application of fertilizer after a herbicide, any residual herbicide will have the opposite intended effect of the fertilizer. Many operators keep separate sprayers for separate chemicals for this very reason. Thus, of course, is redundant and expensive, and so what is needed is an improved portable backpack-style manual-pump-operated agricultural sprayer for spraying a variety of different and/or mixed chemicals from modular containers all seated in a backpack housing, through a hand-carried spray wand. It would be even more advantageous to provide such a sprayer with back-flush capability to clear the sprayer wand and hose upon changeover, thereby reducing or eliminating risk of cross-contamination.

SUMMARY OF THE INVENTION

Accordingly, it is an object of the present invention to provide a portable backpack-style manual-pump-operated agricultural sprayer with multiple modular chemical containers all removably seated in a backpack housing and a manifold assembly for spraying a variety of different (and/or mixed) chemicals from the container, without the need for draining and changing chemicals between applications or washing their interior to avoid cross-contamination.

It is another object to provide the foregoing in a compact backpack-style sprayer footprint with manual pump lever and hand-carried spray wand.

It is another object to provide an operator-controlled manifold assembly for selection of any one (or a mixture) of the chemicals from the containers, and to provide said manifold assembly with back-flush capability to clear the sprayer wand, pump, pressure chamber and hose, emptying residual chemical back into the appropriate container upon changeover, thereby reducing or eliminating any risk of mixing chemicals and cross-contamination.

It is yet another object to provide a portable backpack-style manual-pump-operated agricultural sprayer as described above in which all operator-controls are easily accessible to permit control/changeover or adjustment during spraying without the need to take the sprayer off the operator's back.

In accordance with the above-described objects, an improved multi-container manual-pump-operated backpack sprayer is provided including an open-topped aluminum backpack enclosure, a plurality (preferably three) modular liquid containers removably seated in the enclosure, a hand-lever-operated piston pump and pressure chamber (or "accumulator"), a user-controllable manifold for selecting a particular chemical from the containers (or alternatively, for mixing), and a spray wand. Chemical is carried to the pressure chamber by manually pumping the pump. The pump draws liquid from a manifold-selected supply container outward through tubes to the manifold, which has a console of valves. Separate return tubes are provided for each chemical from the manifold back to the containers of origin, and the manifold allows convenient flushing of each chemical back to its container of origin. This ensures that chemicals from the containers are not mixed or cross-contaminated, and avoids wasting chemicals as all residual is returned back to its respective container. The manifold valves are carried on a waist belt at the hip for ease of control during spraying, without need to take off the backpack sprayer.

The above and other objects, features and advantages of the present invention will become readily apparent from the following detailed description thereof which is to be read in connection with the accompanying drawings.

BRIEF DESCRIPTION OF THE DRAWINGS

Other objects, features, and advantages of the present invention will become more apparent from the following detailed description of the preferred embodiment and certain modifications thereof, in which:

FIGS. 1-2 show a right-side perspective view and left-side perspective view, respectively, of the manual pump-operated sprayer 1 according to the present invention.

DETAILED DESCRIPTION OF THE PREFERRED EMBODIMENTS

Figure 3:
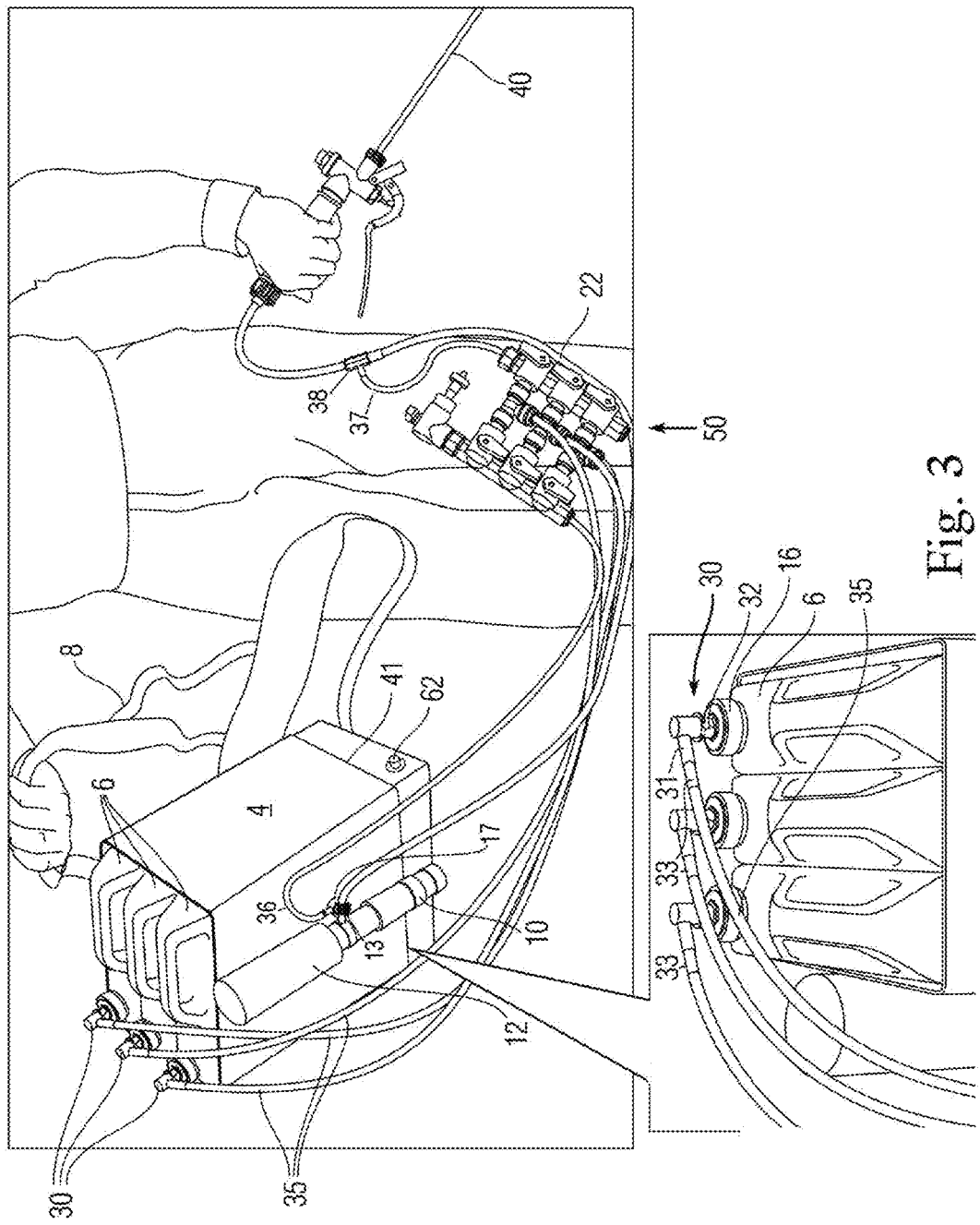
FIG. 3 is an enlarged view of enclosure 4 with three removable containers 6 arranged side-to-side.

The present invention is a portable backpack-style manual-pump-operated agricultural sprayer for spraying a variety of different and/or mixed chemicals from modular containers seated in a backpack-style enclosure, out through a hand-carried spray wand. The present sprayer employs a dispensing system with an operator-controlled manifold having convenient controls for selecting a desired chemical to be sprayed, plus back-flush capabilities to clear the sprayer wand, hose, pressure chamber and manifold upon changeover, thereby eliminating risk of mixing and cross-contamination.

FIGS. 1-2 show a right-side perspective view and left-side perspective view, respectively, of the manual pump-operated sprayer 1 of the present invention. Sprayer 1 generally comprises a five-wall open topped rectangular enclosure 4 with three removable polyethylene chemical containers 6 seated side-to-side inside. The sprayer 1 may be scaled as desired to accommodate more or fewer containers 6, as few as two and as many as desired subject to weight constraints, as a matter of design choice. Each container 6 may be a conventional 5 liter (L) to 10 L leak-proof polyethylene (e.g., HDPE) tank, preferably rectangular for efficient containment in rectangular enclosure 4. Enclosure 4 is equipped on one side with a backpack-style belt and shoulder harness 8 that is padded to rest comfortably against the operator's back, with straps that slip over the operator's shoulders and a waist strap for correctly positioning and securing the device snuggly to the operator. Harness 8 may be any suitable commercial backpack harness including the shoulder straps and the waist strap with means for securing the harness to the back of the enclosure 4. The containers 6 are equipped with an upper opening capped by a removable screw-on closure through which the desired chemicals can be added to the containers 6.

Mounted to the rear of the enclosure 4 is a piston-based pump 10 and integral pressure chamber 12. An angled handle bar 14 is formed with a lever section typically 18-to-24 inches in length and extending to a distal hand grip suspended at the operator's hip. The handle bar 14 runs to a corner of enclosure 4 where it is formed with a 90-degree angled bend, continuing along a rotational section that is as long as necessary to traverse the enclosure 4 from side-to-side, extending about an inch on each side. The rotational section of the handle bar 14 is pivotally mounted to the bottom of the enclosure 4 by insertion through opposing holes having bearings inserted therein to facilitate rotation. The rotational section of the handle bar 14 is connected by an internal linkage-assembly to the bottom of piston-pump 10. Thus, the operator can manually reciprocate the lever section of handle bar 14 in an up-and-down motion to cause the rotational section to rotate, causing the linkage assembly to reciprocate the piston in piston pump 10. This pressurizes pressure chamber 12 and pumps chemical out of a selected one of the containers 6. The chemical is pumped through a manifold assembly 50 (as will be described) and into pressure chamber 12. A length of flexible hose 22 connects the pressure chamber 12 outlet to a hand-carried trigger-operated spray wand 40 through which the pressurized chemical is sprayed. The wand 40 is equipped with a conventional hand-operated trigger-valve 42 and distal spray jet nozzle by which the operator directs and controls the spray as desired. Once the containers 6 of backpack sprayer 1 are filled with the desired chemicals, the operator can select the chemical to be sprayed via the manifold assembly 50, move the handle bar 14 up to pull chemical from a selected container 6 into the piston pump 10, and down to pressurize the chemical into the pressure chamber 12. The operator's other hand is used to hold the wand 40, and to activate and direct the valve 42 and nozzle to control and direct the spray.

FIG. 3 is an enlarged view of enclosure 4 with three modular-removable containers 6 arranged side-to-side inside. Containers 6 are preferably 5 L-to-10 L high density plastic clear/frosted containers to allow viewing of the chemical contents. These flattened rectangular chemical containers, typically formed of HDPE, are commercially available from multiple sources. The containers 6 are equipped with an upper opening capped by a removable cap 16 through which the chemicals can be added to the containers 6. The cap 16 is equipped with a pass-through hose coupling 30 which feeds a hose to the bottom of the container 6 for supply of chemical therefrom. The hose couplings 30 preferably include a quick-disconnect elbow 31 (see inset) to allow easy detachment from cap 16 for removal of the hoses 35, in this case elbow 31 being held captive to cap 16 by a detent-yoke 32 that unclips to allow removal of the elbow 31 and hose 35. Three chemical supply hoses 35 lead from each hose coupling 30 all the way to manifold assembly 50, and each supply hose 35 or cap 16 is preferably color-coded at both ends with a colored label 33 for easy visual correlation of hose 35 to chemical.

Since containers 6 are flat and uniformly-sized, they are stackable and fit snugly side-to-side within the enclosure 4. The enclosure 4 is itself preferably formed of aluminum sheet, e.g., 24 gauge smooth finish, formed and welded as needed into an open-topped rectangular enclosure adapted for slidable top-load insertion of the three containers 6. The enclosure also includes a raised floor 41 beneath which the handle bar 14 and a linkage-assembly to piston-pump 10 are mounted. The handle bar 14 passes through the sides of the enclosure 4 beneath the raised floor 41 and is pivotally-mounted therein by two panel-mounted bearing collars 62 attached in holes in the enclosure 4 side-panels beneath floor 41. The handle bar 14 extends outward from the left-side of enclosure 4 (obscured in FIG. 3) for operator-actuation. The piston-based pump 10 and integral pressure chamber 12 are mounted by yoke-brackets to the rear of enclosure 4 as shown.

Figure 5:
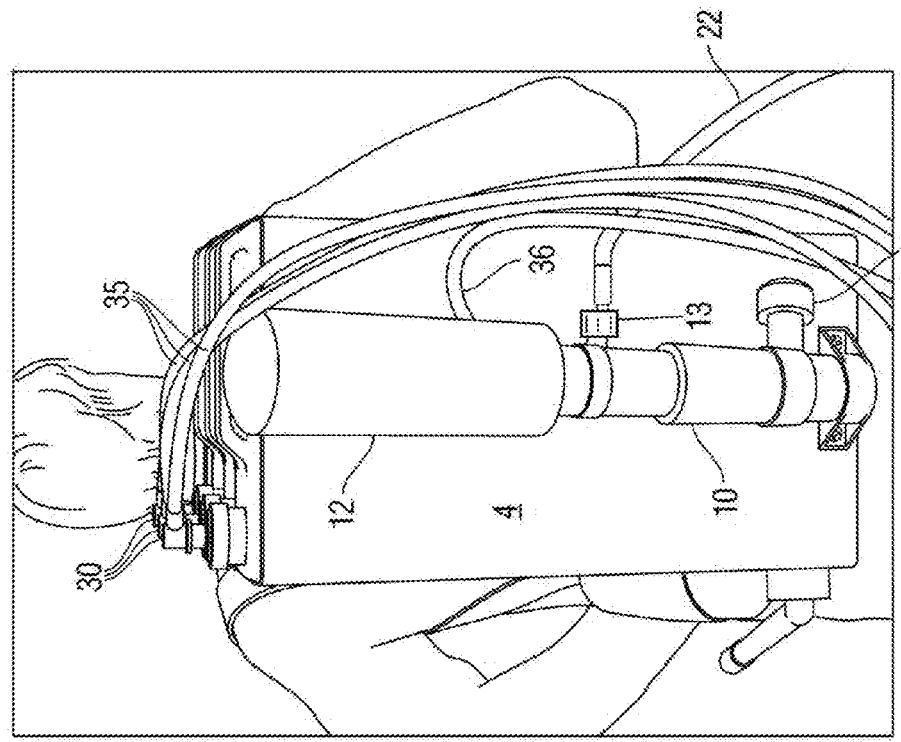
FIGS. 4 and 5 are left-side perspective view and right-side perspective view of the piston-based pump 10 and integral pressure chamber 12 mounted to the rear of enclosure 4.
Figure 4:
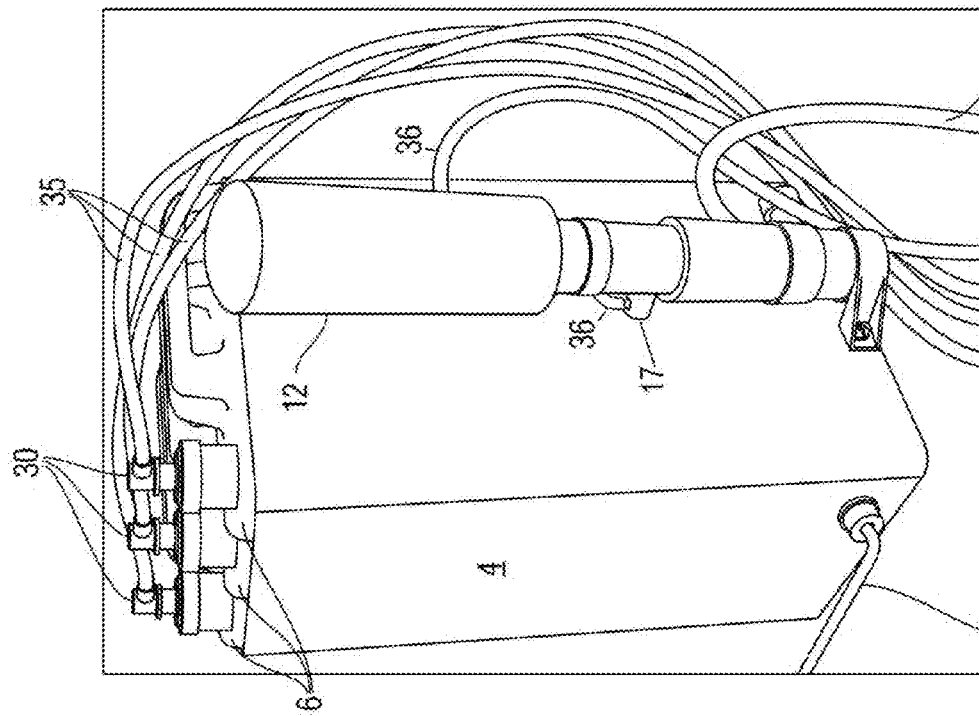

FIGS. 4 and 5 are left-side perspective view and right-side perspective view of the piston-based pump 10 and integral pressure chamber 12 mounted to the rear of enclosure 4. Both piston-based pump 10 and integral pressure chamber 12 may be any suitable commercially-available components such as, for example, Birchmeier™ six (6) bar pressure, high flow rate, externally mounted piston and accumulator assembly. In this case the piston pump 10 is integral to the pressure chamber 12. Down-stoke on the piston (that is, pulling up on the handle bar 14) inducts chemical from the large containers 6 into the piston pump 10 cylinder chamber through hose 36 and a one-way valve 17 (see FIG. 4). Up-stroke of the piston (that is, pushing down on the handle bar 14) pushes and pressurizes the chemical into the pressure chamber 12. Additional up and down strokes can be utilized to both push more chemical into and increase the pressure within the pressure chamber up to the rated (6 bar) pressure. Accordingly, the operator has the option of more or less continuous pumping of the handle bar 14 to create a more or less steady stream of chemical at constant pressure. Chemical in the pressure chamber 12 is ejected through outlet 13.

As seen in FIG. 5, a grease port 54 is provided for lubrication of the piston pump 10.

Figure 6:
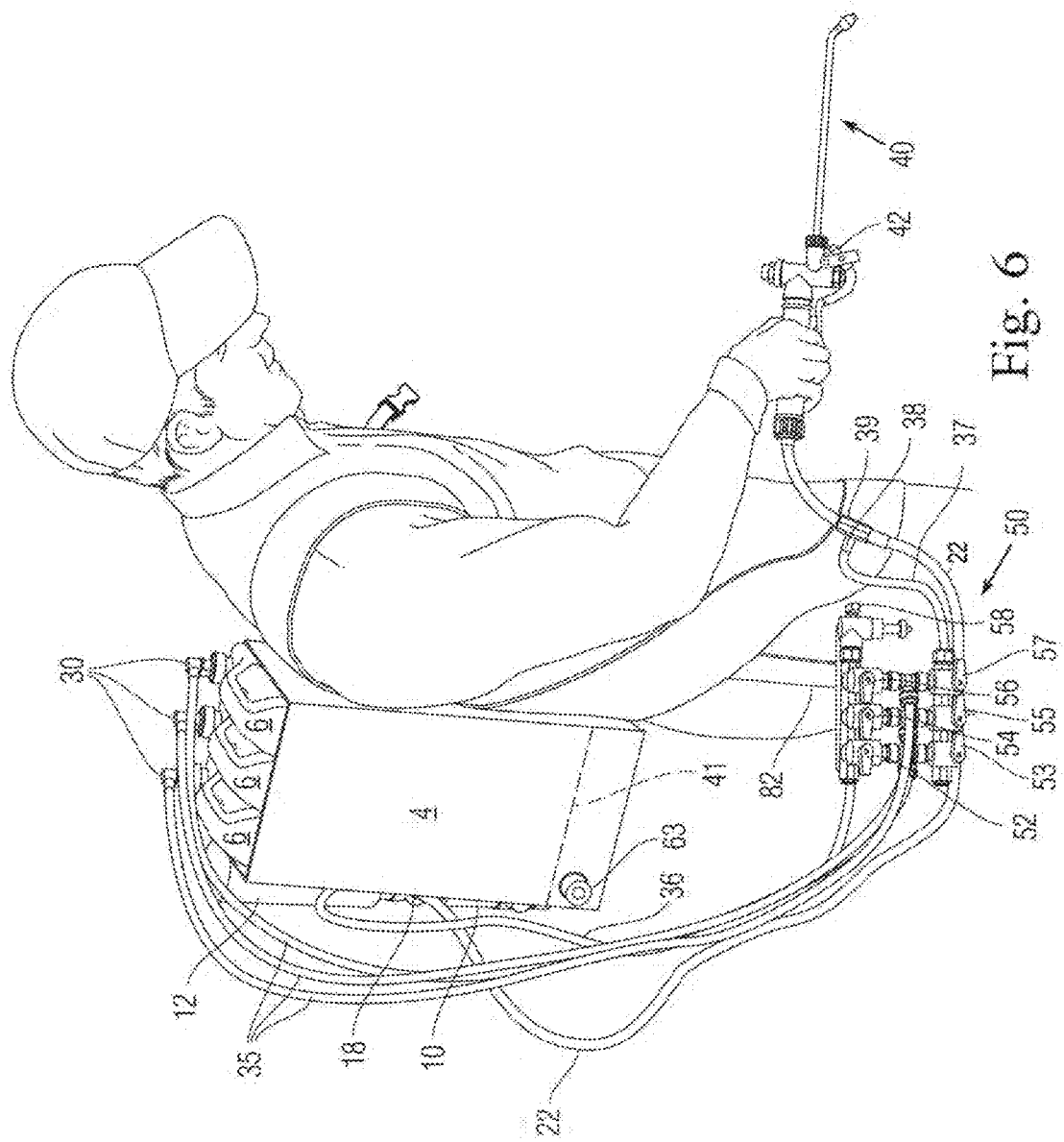
FIG. 6 is a side close-up view of the manifold assembly 50 and sprayer wand 40.

FIG. 6 is a side close-up view of the manifold assembly 50 and sprayer wand 40. The manifold assembly 50 comprises a matrix of manually-operated valves 52-58 having thumb-twist-knobs for ease of operation. Certain valves are pass-through ON/OFF valves and some are diverter valves capable of diverting a chemical to one of two outputs. Valve 58 is a plastic ON/OFF pass-through valve with a finger twist-knob for ease of operation, and it is connected to an external port through a one-way check valve 63 to provide air intake during the backwash process. The check valve 63 (see FIGS. 7, 9) allows air intake but not air/chemical escape. At least the six diverter valves 52-57 are required to manifold three chemical containers 6. The input of three diverter valves 52, 54, 56 is connected to the input of three respective diverter valves 53, 55, 57, each at an input junction. Each of the three hoses 35 from each of the three containers 6 is connected a corresponding chemical input junction 67, 45, 23 between the paired diverter valves 52/53, 54/55, 56/57. The outputs of diverter valves 52, 54, 56 are connected in series as shown, and through the pass-through valve 58 to the port/check valve 63. Similarly, the outputs of diverter valves 53, 55, 57 are connected in series as shown, and (as seen in FIG. 3) on through a short length of hose 37 that runs to a junction at a T-connector 38 interrupting the hose 22 to spray wand 4. Preferably, the T-connector 38 is located as close as possible to spray wand 4. Thus, the operator may selectively open any one of the spray valves 52, 54, 56 in order to divert chemical from a respective selected container 6 back to the piston pump 10. Upon pumping, the chemical exits pump 10 through main output hose 22 and travels to the spray wand 40 for release by trigger 42. To conveniently changeover to another chemical, the opened spray (diverter) valve 52, 54 or 56 is closed, the corresponding backflush (diverter) valve 53, 55, 57 is opened along with the ported one-way valve 58, and the handle bar 14 is pumped in order to backflush (by air suction) all existing chemical still in the main output hose 22, pump 10, and manifold 50 back into the proper container 6. After backflushing the corresponding backflush valve 53, 55, 57 may be closed and a different spray valve 52, 54 or 56 opened to spray a different chemical from containers 6, thereby minimizing any risk of chemical mixing.

Importantly, the manifold assembly 50 is located remotely from enclosure 4, connected thereto by tubes 33, 36, 22 a few feet in length. This provides a significant advantage, allowing the manifold 50 to be conveniently suspended from the shoulder/waist harness 8 by a strap 82, thereby positioning the manifold assembly 50 and its controls 52-58 at the operator's hip for convenient access. The hip-height handle bar 14 on one side in combination with the inline manifold 50 and sprayer wand 40 on the other side results in a comfortable two-handed carrying of the sprayer 1, and the operator can release the wand 40 to adjust the manifold 50 and easily regain the wand 40.

Additionally, the remote location of manifold 50 in conjunction with the location of junction 38 and T-connector 39 (as close as possible to spray wand 4) maximizes the effectiveness of the backflush, essentially draining residual chemical as far up as the spray wand 4 back into its appropriate container 6. Again, operation of the manifold control panel 52-58 is color-coded by labels 33.

The spray wand 40 may be any conventional trigger 42-operated wand with distal spray nozzle.

Figure 7:
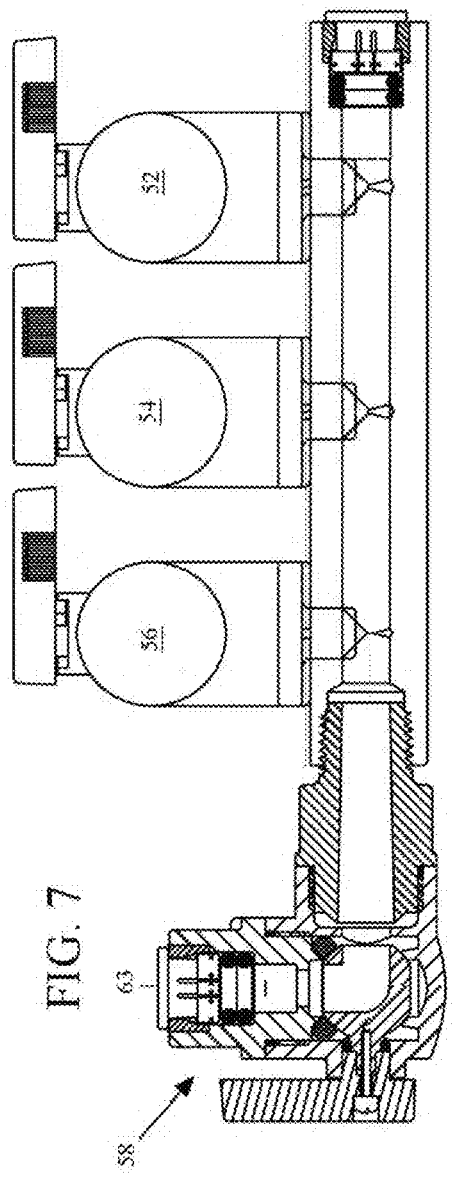
FIG. 7 is a side cross-section of the manifold assembly 50.
Figure 8:
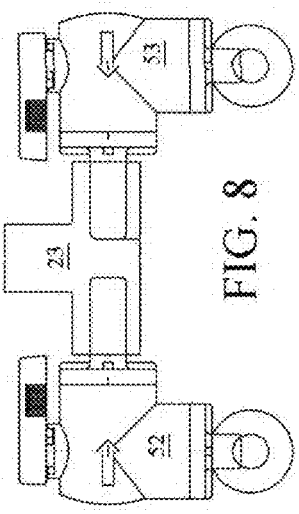
FIG. 8 is a top cross-section of the manifold assembly 50.
Figure 9:
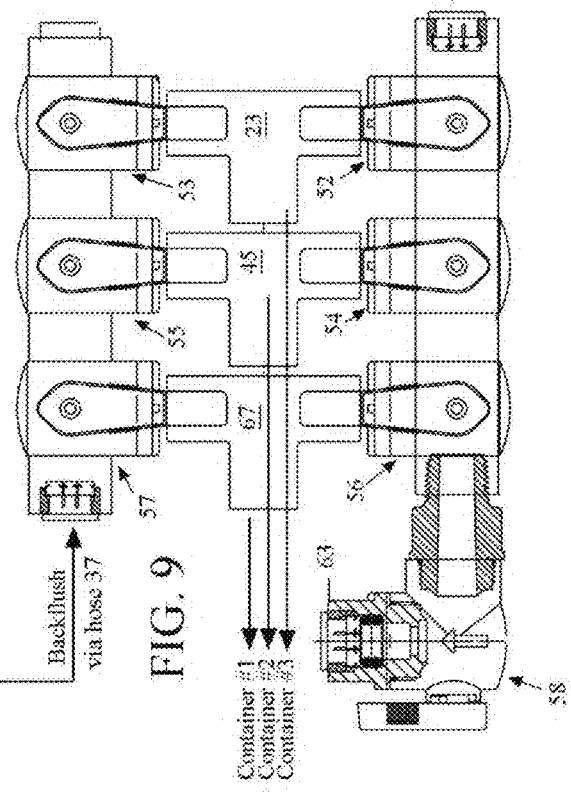
FIG. 9 is an end view of the manifold assembly 50.

FIGS. 7-9 are a side cross-section, top cross-section, and end view of the manifold assembly 50 illustrating the matrix of manually-operated valves 52-58. Six valves 52-57 are plastic angle hose diverter valves with thumb-twist-knobs as shown. Each of the three hoses 35 from each of the three containers 6 is connected to a T-junction 67, 45, 23, respectively, between the paired diverter valves 52/53, 54/55, 56/57. The outputs of diverter valves 52, 54, 56 are connected in series as shown, and through the pass-through valve 58. Diverter valves 52, 54, 56 apply suction from pump 10 and hose 36 into the appropriate hoses 35 of the three containers 6. Thus, any of the three spray valves 52, 54, 56 may be opened to spray chemical from the selected container 6. Down-stoke on the piston (that is, pulling up on the handle bar 14) inducts chemical from the large containers 6 through a select hose 35, up through select junction 67, 45, 23, through the open spray valve 52, 54, 56, back through hose 36 into the pump 10 for spraying out through hose 22 and wand 40.

Similarly, the outputs of diverter valves 53, 55, 57 are connected in series as shown to hose 37. Diverter valves 57, 55, 53 divert/backflush chemical returning from spray wand 40 through T-connector 39, junction 38 and hose 37 into the appropriate hose 35 for return to the proper one of the three containers 6. To changeover to another chemical, the opened spray valve 52, 54 or 56 is closed, the corresponding backflush valve 53, 55, 57 is opened along with the ported one-way valve 58, and the handle bar 14 is pumped in order to backflush (by air suction) all existing chemical still in the main output hose 22, pump 10, and manifold 50 back into the proper container 6. After backflushing the corresponding backflush valve 53, 55, 57 may be closed and a different spray valve 52, 54 or 56 opened to spray a different chemical from containers 6, thereby minimizing any risk of chemical mixing.

One skilled in the art should understand that the above-described sprayer 1 is designed to reduce or eliminate inadvertent mixing of chemicals that should not be mixed. If, on occasion, an application of chemicals calls for onsite mixing of two or three chemicals this can be accomplished simply by making the spray valves 52, 54, 56 adjustable-variable-flow valves, thereby allowing the operator to open any one, two or all three in varying degrees to mix the chemicals in containers 6.

It should now be apparent that the manual pump-operated backpack sprayer 1 of the present invention allows selective spraying of different chemicals from any of a plurality of containers 6 in successive applications without ever taking off the sprayer. Moreover, it provides full and convenient control over the selected chemical, as well as full backflush capabilities so that operators do not need to wash the inside of the sprayer tank and flush all internal components between applications. Backpack sprayer 1 reduces the risk of cross-contamination and avoids the need to keep separate sprayers for separate chemicals.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A backpack sprayer for selectively spraying one or more different chemicals, comprising:
    an enclosure including a plurality of chemical containers, each of said chemical containers having an outlet and being configured for containing and dispensing a chemical through said outlet;
    a harness attached to said enclosure for wearing backpack-style;
    a piston pump;
    a manifold assembly in fluid communication with said pump and each of said plurality of chemical containers, said manifold assembly including a plurality of spray valves for selecting any one of said chemical containers for dispensing a chemical contained therein through the corresponding outlet, and a plurality of backflush valves for selecting any one of said chemical containers for backflushing a dispensed chemical back into its respective container, each of said plurality of spray valves and each of said plurality of backflush valves comprising a two-way diverter valve having an input port and two selectable output ports, the input port of each of said plurality of spray valves being connected to the input port of a corresponding one of said plurality of backflush valves at a T-junction, and each said T-junction being connected to a corresponding one of said plurality of chemical containers; and
    a user-actuated spray wand connected by a T-junction with both said piston pump and manifold for spraying a dispensed chemical;
    the plurality of backflush valves being connected in series to the T-junction of the user-actuated spray wand, and the plurality of spray valves being connected in series to the piston pump.

2. The backpack sprayer according to claim 1, wherein said enclosure is an open-topped five-walled enclosure.

3. The backpack sprayer according to claim 2, wherein said plurality of chemical containers are removably seated in said enclosure.

4. The backpack sprayer according to claim 1, wherein said plurality of chemical containers consist of three containers.

5. The backpack sprayer according to claim 1, wherein said pump comprises a hand-operated piston pump.

6. The backpack sprayer according to claim 5, wherein said pump comprises a pressure chamber.

7. The backpack sprayer according to claim 6, wherein said pump is mounted to said enclosure.

8. The backpack sprayer according to claim 1, wherein all of said spray valves and backflush valves include thumb-switches.

9. The backpack sprayer according to claim 1, wherein said harness includes a pair of shoulder straps and a belt strap.

10. The backpack sprayer according to claim 9, wherein said manifold assembly is attached to said belt strap for positioning at the user's waist.

11. A backpack sprayer for selectively spraying one or more different chemicals, comprising:
    an open-topped walled enclosure;
    a shoulder harness attached to said enclosure for wearing backpack-style;
    a plurality of modular chemical containers removably seated in the enclosure;
    a hand-operated piston pump and pressure chamber combination mounted to said enclosure;
    a manifold assembly in fluid communication with both said piston pump and each of said plurality of containers, said manifold assembly including a plurality of spray valves for selecting any one of said chemical containers for dispensing a chemical contained therein for spraying, and a plurality of backflush valves for selecting any one of said chemical containers for backflushing a dispensed chemical back into its respective container after spraying, all of said plurality of valves comprising a two-way diverter valve having an input port and two selectable output ports, the input port of each of said plurality of spray valves being connected to the input port of a corresponding one of said plurality of backflush valves at a T-junction, and each said T-junction being connected to a corresponding one of said plurality of chemical containers; and
    a user-actuated spray wand connected by a T-junction with both said piston pump and manifold for spraying a dispensed chemical; and the plurality of backflush valves being connected in series to the T-junction of the user-actuated spray wand, and the plurality of spray valves being connected in series to the piston pump.

12. The backpack sprayer according to claim 11, wherein said enclosure is a five-walled enclosure.

13. The backpack sprayer according to claim 11, wherein each one of said plurality of chemical containers is independently removable from said enclosure.

14. The backpack sprayer according to claim 13, wherein said plurality of chemical containers consist of three containers.

15. The backpack sprayer according to claim 11, wherein all of said spray valves and backflush valves include thumb-switches.

16. The backpack sprayer according to claim 11, wherein said harness includes a belt strap, and said manifold assembly is attached to said belt strap for positioning at the user's waist.

* * * * *